United States Patent
Ma et al.

(10) Patent No.: US 9,625,206 B2
(45) Date of Patent: Apr. 18, 2017

(54) TRANSPORT REFRIGERATION UNIT WITH AUXILIARY POWER CIRCUIT AND INTERLOCK

(75) Inventors: RongAi Ma, Singapore (SG); Kenneth Cresswell, Cazenovia, NY (US); David Whyte, Fayetteville, NY (US)

(73) Assignee: CARRIER CORPORATION, Farmington, CT (US)

( * ) Notice: Subject to any disclaimer, the term of this patent is extended or adjusted under 35 U.S.C. 154(b) by 974 days.

(21) Appl. No.: 13/810,898

(22) PCT Filed: Jul. 21, 2011

(86) PCT No.: PCT/US2011/044794
§ 371 (c)(1),
(2), (4) Date: Jan. 18, 2013

(87) PCT Pub. No.: WO2012/018537
PCT Pub. Date: Feb. 9, 2012

(65) Prior Publication Data
US 2013/0113289 A1 May 9, 2013

Related U.S. Application Data

(60) Provisional application No. 61/367,663, filed on Jul. 26, 2010.

(51) Int. Cl.
*F25D 29/00* (2006.01)
*B60H 1/00* (2006.01)
(Continued)

(52) U.S. Cl.
CPC ....... *F25D 29/006* (2013.01); *B60H 1/00428* (2013.01); *B60H 1/3232* (2013.01); *H02J 4/00* (2013.01); *Y10T 307/615* (2015.04)

(58) Field of Classification Search
CPC .... H02J 9/06; H02J 9/061; H02J 9/062; H02J 9/08; H01H 2300/018; F16P 3/08;
(Continued)

(56) References Cited

U.S. PATENT DOCUMENTS 3,553,475 A * 1/1971 Fee ................... B60H 1/00428
307/10.6
3,564,274 A * 2/1971 Kaltz ....................... H02P 4/00
307/10.1
(Continued)

FOREIGN PATENT DOCUMENTS

CN 2068086 U 12/1990
CN 201191120 Y 2/2009
(Continued)

OTHER PUBLICATIONS

Chinese Office Action for application CN 201180036537.8, dated Jan. 6, 2015, 11 pages.
(Continued)

*Primary Examiner* — Thienvu Tran
*Assistant Examiner* — David M Stables
(74) *Attorney, Agent, or Firm* — Cantor Colburn LLP

(57) ABSTRACT

A pre-wired auxiliary power circuit (45, 47) is built into a transport refrigeration system for supplying electrical power to an optional auxiliary system when installed in connection with the transport refrigeration unit. A low cost safety interlock (70) is provided in association with the auxiliary power circuit.

9 Claims, 5 Drawing Sheets

(51) Int. Cl.
*B60H 1/32* (2006.01)
*H02J 4/00* (2006.01)

(58) Field of Classification Search
CPC .. F16P 3/14; F16P 3/20; A01D 34/828; G11B 33/02
USPC ......................................................... 307/64
See application file for complete search history.

(56) References Cited

U.S. PATENT DOCUMENTS

| | | | | |
|---|---|---|---|---|
| 4,429,935 | A | * | 2/1984 | Lamb ................... H01R 29/00 318/442 |
| 4,470,270 | A | | 9/1984 | Takada et al. |
| 5,396,027 | A | * | 3/1995 | Zemen, Jr. ............. H01R 25/00 174/494 |
| 2007/0295017 | A1 | * | 12/2007 | Pannell .............. B60H 1/00364 62/236 |

FOREIGN PATENT DOCUMENTS

DE        3105608 A1    11/1982
WO    2010002644 A1    1/2010

OTHER PUBLICATIONS

PCT International Preliminary Report on Patentability and Written Opinion of the International Searching Authority for International Application No. PCT/US2011/044794, Feb. 7, 2013, 9 pages.
International Search Report and Written Opinion mailed Jan. 31, 2012.

\* cited by examiner

TRANSPORT REFRIGERATION UNIT WITH AUXILIARY POWER CIRCUIT AND INTERLOCK

CROSS-REFERENCE TO RELATED APPLICATION

This application claims priority to U.S. Provisional Patent Application Ser. No. 61/367,663, entitled "Transport Refrigeration Unit with Auxiliary Power Circuit and Interlock," filed on Jul. 26, 2010. The content of this application is incorporated herein by reference in it entirety.

FIELD OF THE INVENTION

This invention relates generally to transport refrigeration units and, more particularly, to providing a transport refrigeration unit with a built-in auxiliary power circuit for supplying electrical power to optional auxiliary equipment when installed and to providing a power interlock that interrupts the supply of power when the auxiliary equipment is removed.

BACKGROUND OF THE INVENTION

Temperature-controlled containers are commonly used for shipping perishable cargo, such as fresh produce and other foods, which must be maintained during transit at a temperature within a specified temperature range to maintain freshness and minimize spoilage. Containers of this type are typically designed to accommodate transport by road on trailers, by sea on container ships, by rail on flat-bed train cars and even by air in cargo planes. Such versatile containers are commonly referred to as intermodal containers.

In conventional industry practice, temperature controlled containers are equipped with a refrigeration unit, commonly referred to as a reefer, that is secured to one wall of the container, typically the front wall of the container. The refrigeration unit includes a compressor, a compressor motor, and a condenser unit isolated from the cargo space, and an evaporator unit operatively associated with the cargo space defined within the container. The refrigeration unit is adapted to receive electrical power from an external source. During ship board transit, the refrigerant unit is typically connected to a ship board power supply, while in transit by road or rail, a diesel engine driven generator, commonly referred to a gen-set is temporarily attached to the container for generating electricity for powering the refrigeration unit.

Depending upon the product being shipped, it may be desirable to install an auxiliary system in operative association with the refrigeration unit to temporarily customize the container for the duration of a trip. At the end of the trip, the auxiliary system may be removed to de-customize the container. In situations where the auxiliary system requires electrical power, it is necessary to field wire the container pre-trip to provide an auxiliary power circuit for supplying electricity from the refrigeration unit's power supply and then to remove the auxiliary power circuit post-trip. To reduce the field labor and the time involved in pre-trip installation and post-trip removal of an auxiliary system and associated auxiliary power circuit, a need exists to provide a transport refrigeration system for a container having a built-in auxiliary power circuit for supplying electrical power to an optional installed auxiliary system in a safe manner.

SUMMARY OF THE INVENTION

A transport refrigeration unit for conditioning the atmosphere within a transport cargo space includes an auxiliary electrical power circuit. The auxiliary electrical power circuit taps off an electrical power circuit operatively associated with the transport refrigeration unit as a source of electrical power to which an auxiliary system may be connected when installed in operative association with the transport refrigeration unit. The auxiliary power circuit is energized only when the evaporator fan motors are energized. In an embodiment, a safety power interlock is included in operative association with a main power supply circuit of the transport refrigeration unit. The safety power interlock breaks the main power supply circuit when the auxiliary system is removed. The transport refrigeration unit includes a seal cap disposed in operative association with the auxiliary electrical power circuit and with the safety power interlock when the auxiliary system is removed. The seal cap closes the safety power interlock so as to supply electrical power through the main power supply circuit to the transport refrigeration unit.

In an embodiment, the transport refrigeration unit further includes an auxiliary electrical power outlet including: a first contact in electrical communication with the source of electrical power, a second contact in electrical communication with the source of electrical power, a third contact in electrical communication with an electrical ground, a fourth contact forming a first terminal in the main power supply circuit, and a fifth contact forming a second terminal in the main power supply circuit, the main power supply circuit being open between the first and second terminals. In this embodiment, the seal cap is adapted to mate with the auxiliary electrical power outlet. When mated with the auxiliary electrical power outlet, the seal cap establishes an electrical connection between the fourth and fifth contacts and blocking electrical connection with the first, second and third contacts. A first in-line fuse may be operatively connected between the first contact and the source of electrical power and a second in-line fuse may be operatively connected between the second contact and the source of electrical supply.

Additionally, a method is provided for powering an auxiliary system associated with a transport refrigeration unit comprising the steps of: providing an auxiliary electrical power circuit tapping off an electrical power circuit operatively associated with the transport refrigeration unit as a source of electrical power to which the auxiliary system connects when installed, and providing for the auxiliary electrical power circuit to be energized only when the evaporator fan motors of the transport refrigeration unit are energized. The method may also include the step of providing a safety power interlock in operative association with a main power supply circuit of the transport refrigeration unit, the safety power interlock opening the main power supply circuit when the auxiliary system is removed. The method may include the further step of providing a seal cap in operative association with the auxiliary electrical power circuit and with the interlock when the auxiliary system is removed, the seal cap closing the interlock to supply electrical power through the main power supply circuit to the transport refrigeration unit.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
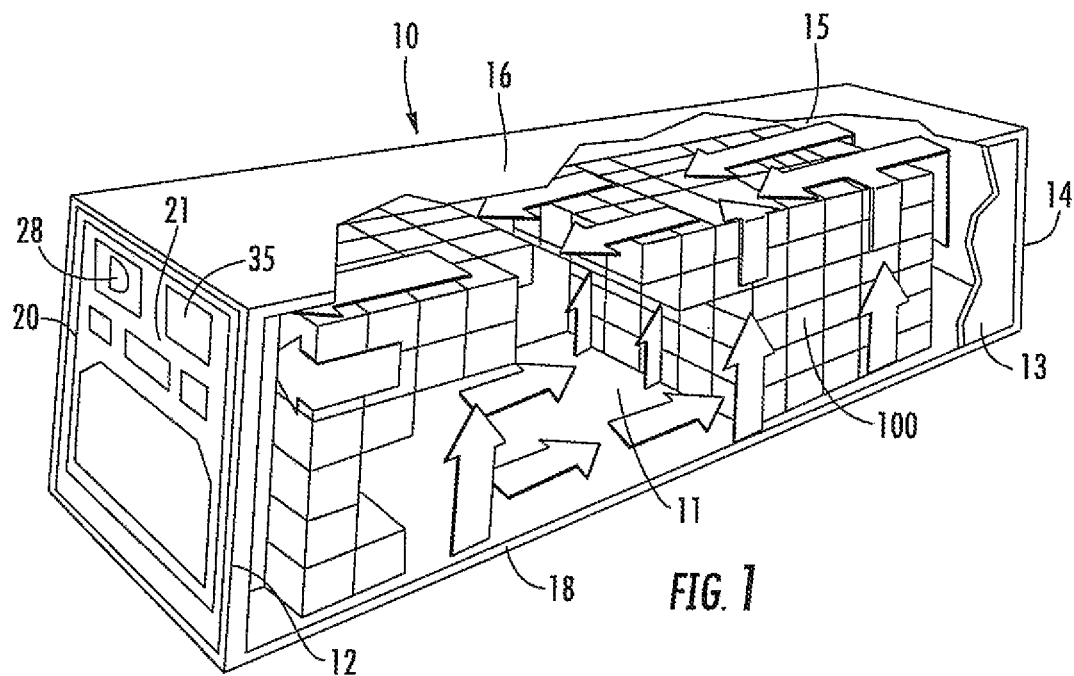
FIG. 1 is a perspective view of a refrigerated transport container, equipped with a refrigeration unit, with a portion of the side wall and ceiling removed.

Referring initially to FIG. 1 of the drawing, there is depicted an exemplary embodiment of a refrigerated cargo container, generally referenced 10. The cargo container 10 has a box-like structure formed of a forward or front wall 12, a back or rear wall 14, a pair of opposed sidewalls 13 and 15, a ceiling 16 and a floor 18. The box-like structure defines a cargo space 11 in which the bins, cartons or pallets of cargo 100 being transported are stacked on the floor 18. The rear wall 14 is provided with one or more doors (not shown) through which access to the cargo space may be had for loading the cargo 18 into the container 10. When the doors are closed, a substantially air-tight, sealed cargo space is established within the container 10 which prevents inside air from escaping the cargo space 11.

Figure 2:
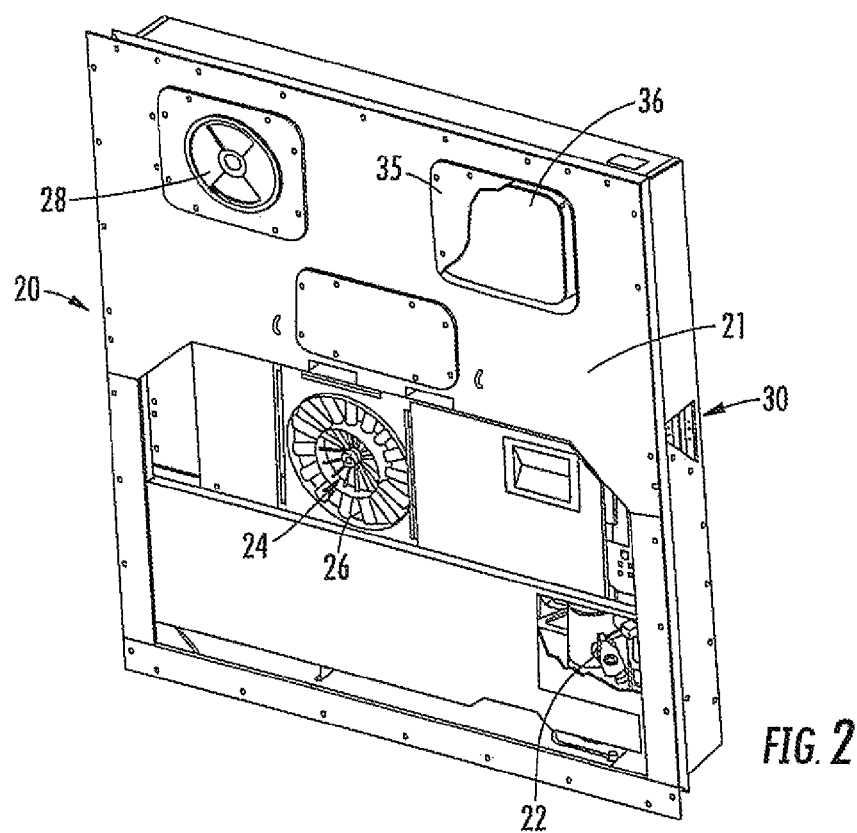
FIG. 2 is an elevation view of the front of the refrigeration unit mounted to the forward wall of the container of FIG. 1.

A refrigeration unit 20, as known as a reefer, is mounted to a wall of the container 10, generally to the forward wall 12 of the container 10 as depicted in FIG. 1, for conditioning the air within the cargo space 11 of the container 10. Referring now to FIG. 2, in particular, the refrigeration unit 20 includes a compressor 22 with an associated compressor drive motor and a condenser module 24 isolated from the cargo space 11, mounted in the lower section of the refrigeration unit 20, and an evaporator module 30 operatively associated with the cargo space 11 defined within the container 10. The condenser module includes a refrigerant heat rejection heat exchanger (not shown) positioned behind the front panel 21, and one or more condenser fans 26 that draw ambient outdoor air through the condenser heat exchanger and discharge that air back into the outdoor environment. A fresh air makeup vent 28 may be provided for admitting fresh outdoor air into the air flow circulating through the evaporator module 30.

Figure 3:
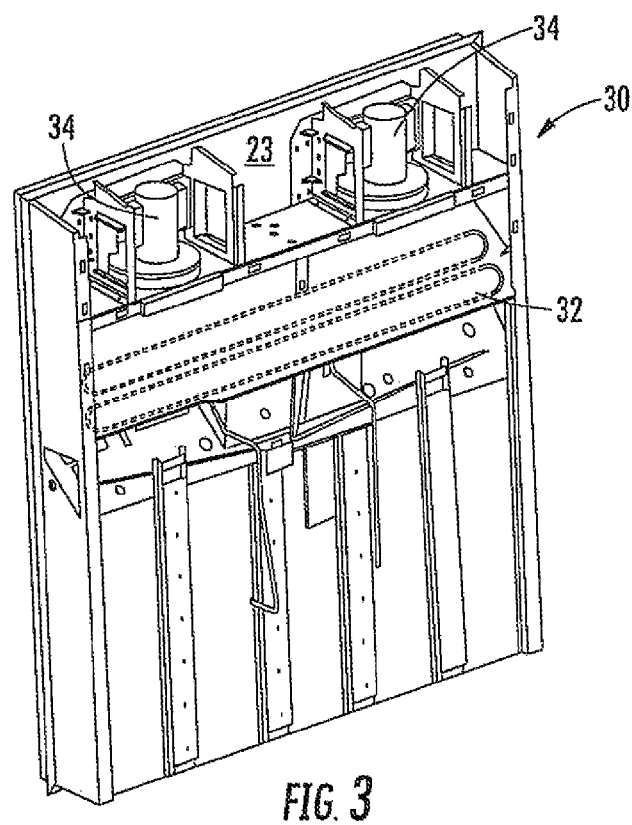
FIG. 3 is an elevation view of the evaporator face of the refrigeration unit mounted to the forward wall of the container of FIG. 1 looking forward from within the cargo space defined within the container.

As illustrated in FIG. 3, the evaporator module 30 includes a refrigerant heat absorption heat exchanger 32 and one or more, typically two, evaporator fan/fan motor assemblies 34 that draw return air from the cargo space 11 into a plenum 23 defined within the confines of the container 10 along an upper region of the forward wall 12 of the container 10. The evaporator fans pass the return air, and any fresh outdoor air that may be admitted through the fresh air makeup vent 28 and mixed therewith in the plenum 23, downwardly through the evaporator heat exchanger 32 for temperature conditioning and deliver that conditioned air as supply air back into the cargo space 11 defined within the container 10. Although the refrigeration unit 20 is typically operated in the cooling mode to reduce the temperature of the return air, the refrigeration unit 20 may be equipped with an auxiliary air heating device (not shown) for heating the return air when the container 10 is in transit in a region having an environment wherein the ambient outdoor temperature is below the desired cargo transport temperature.

It may be desirable when transporting certain food products to install an auxiliary system in association with the refrigeration unit to customize the container for optimal transport of that particular product. For example, certain fresh fruits and vegetables, such as for example apples, asparagus, avocados, bananas, berries, cherries, citrus fruits, cucumbers, ginger, grapes, green beans, kiwifruit, mangoes, melons, onions, papaya, pears, peppers, pineapples, potatoes, stonefruits, tomatoes and tropical fruits, are decay-prone and ethylene sensitive. A refrigerated transport container to be used for shipping such perishable produce may be customized for that trip by installing an auxiliary system for generating ozone in operative association with the refrigeration unit.

For example, in the depicted embodiment, the refrigeration unit 20 is equipped with an active purification system 36 which is installed within the evaporator fan access behind access panel 35 in the front panel 21 and integrated into the refrigeration unit 20 to generate ozone that is introduced into the air flow circulated from the cargo space 11 through the evaporator module 30 and supplied back into the cargo space 11. The ozone is effective to purify air and surfaces within the cargo space 11 throughout the trip by actively consuming ethylene and helping to eliminate pathogenic microorganisms such as molds, yeasts, bacteria, and viruses that can attack and spoil the perishable produce. An ozone-based active purification system is marketed by Carrier Corporation of Farmington, Conn., USA, for pre-trip installation on refrigerated containers under the trade name Purfresh Transport Service. Upon completion of the trip, the auxiliary system, i.e. the active purification system 36 in the depicted embodiment, is removed and the refrigerated container 20 restored to a general service state.

Figure 4:
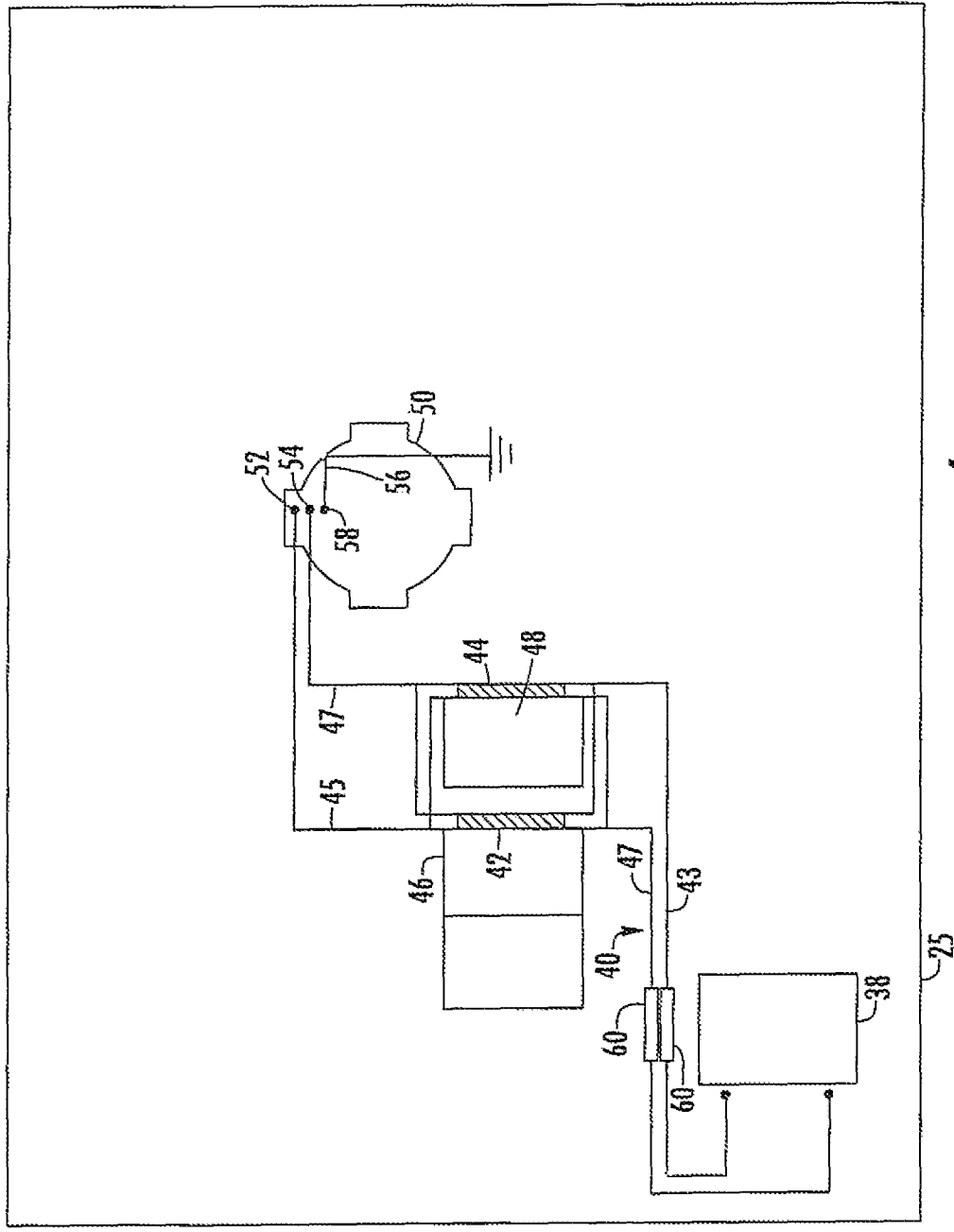
FIG. 4 is a schematic diagram illustrating an exemplary embodiment of the auxiliary electrical power circuit disclosed herein connecting through the control box of the transport refrigeration unit.
Figure 5:
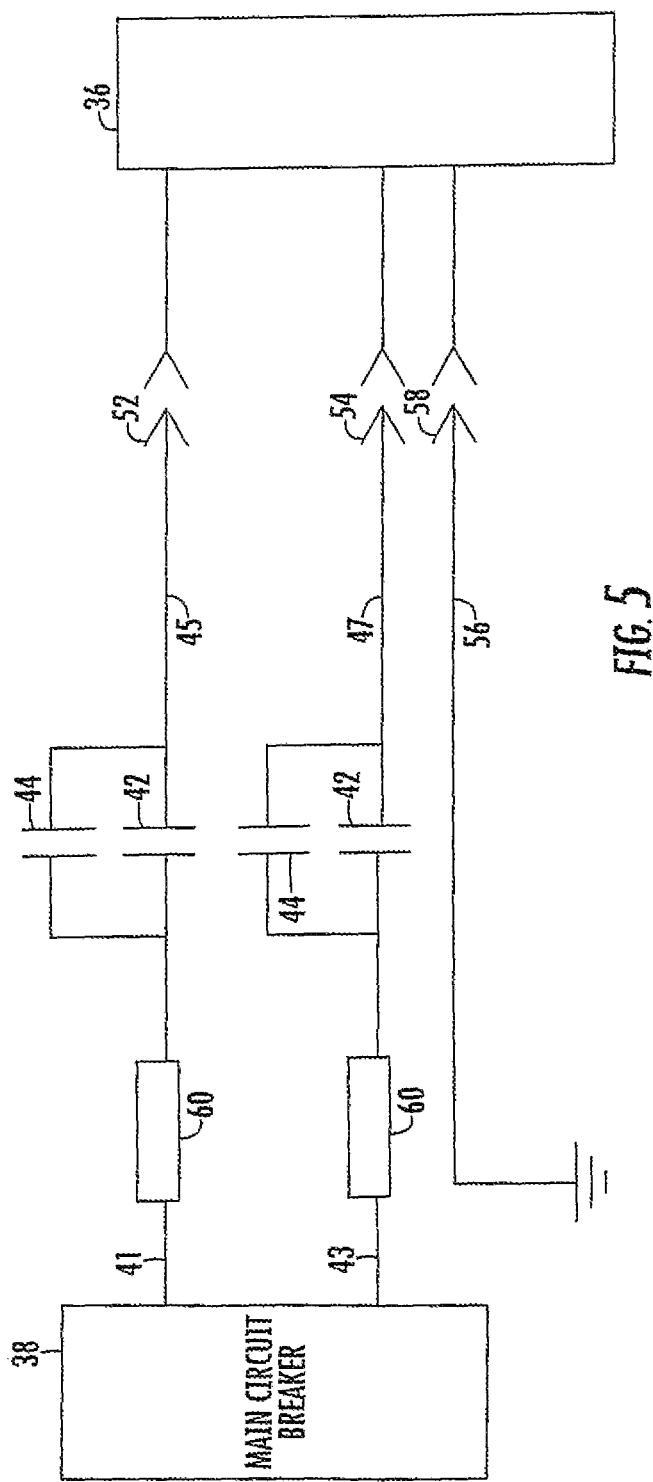
FIG. 5 is a schematic diagram illustrating a pre-wired assembly of the auxiliary electrical power circuit of FIG. 4.

As the active purification system 36 requires electrical power to generate ozone, the transport refrigeration unit 20 is adapted in accordance with the disclosure herein to include a pre-wired, built-in auxiliary electrical power circuit 40 through which electrical power is supplied to the active purification system 36 from the power supply to the refrigeration unit 20 when the active purification system 36 is installed. Referring now to FIGS. 4 and 5 in particular, the auxiliary electrical power circuit 40 provides electrical communication between a source of power to the transport refrigeration unit 20, namely the main circuit breaker panel 38, and a pair of contacts 52 and 54 on an auxiliary electrical power circuit outlet 50. The outlet 50 may be located behind the front panel 21 of the transport refrigeration unit 20 in the access area in which the auxiliary unit 36 would be housed when installed. The auxiliary electrical power circuit includes a ground wire 56 connecting contact 58 on the outlet 50 to electrical ground.

The auxiliary electrical power circuit 40 includes a first auxiliary contactor 42 and a second auxiliary contactor 44. The first and second auxiliary contactors 42 and 44 are located in control panel box 25 of the transport refrigeration unit 20. The first contactor 42 is operatively associated, for example mechanically engaged, with a set 46 of power contactors associated with the supply of power to at least one evaporator fan motor for low speed operation. The second contactor 44 is operatively associated, for example mechanically engaged, with a set 48 of power contactors associated with the supply of electrical power to at least one evaporator fan motor for high speed operation. The auxiliary electrical power circuit 40 includes a wire 41 connecting a hot tap in the main circuit breaker panel 38 to the first auxiliary contactor 42, a wire 43 connecting a hot tap in the main circuit breaker panel 38 to the second auxiliary contactor 44, a wire 45 connecting the first auxiliary contactor 42 and the second auxiliary contactor 44 to the first contact 52 on the outlet 50, and a wire 47 connecting the first auxiliary contactor 42 and the second auxiliary contactor 44 to the second contact 54 on the outlet 50. An in-line fuse 60 may be interdisposed in each of the wires 41 and 43. In an embodiment, the wires 41 and 43 and the inline fuses 60 are part of an in-line fuse holder assembly that, as a back-up safety precaution, may be removed when no auxiliary unit 36 is installed on the transport refrigeration unit 20 thereby disabling the auxiliary electrical power circuit.

Since both the low speed set 46 and the high speed set 48 of evaporator fan motor contactors have one of the pair of auxiliary contactors 42, 44 operatively associated, for example mechanically engaged, therewith, the auxiliary electrical power circuit 40 will be energized whenever the evaporator fan motor contactors are energized, whether to power the evaporator fan motors for low speed fan operation or for high speed fan operation. When either evaporator fan motor contactor 46, 48 is energized, its mechanical interlock action will engage the associated auxiliary contactor 42, 44 to control the power to the optional auxiliary system through the auxiliary electrical power circuit 40. Each of the wires 45, 47, 56 may be existing spare wires in the high voltage wiring harness of the transport refrigeration unit 20.

Figure 6:
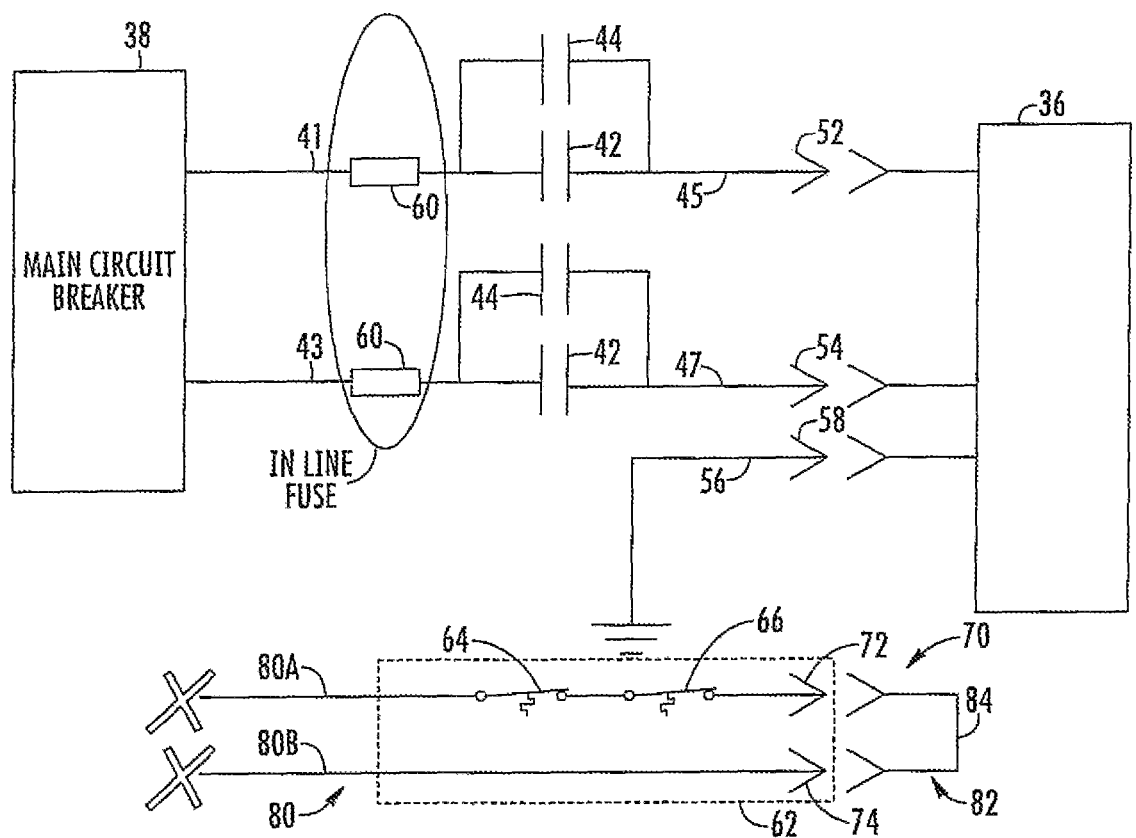
FIG. 6 is a schematic diagram illustrating a safety power interlock in association with the auxiliary electrical power circuit of FIG. 5.

Referring now to FIG. 6, the transport refrigeration system 20 further includes a safety interlock 70 in operative association with the main power supply circuit of the transport refrigeration unit for breaking the main power supply circuit when the auxiliary system 36 is removed. The interlock 70 may be integrated with the internal motor protector 62 of the evaporator fan motor. It is customary practice in conventional transport refrigeration units to provide an internal motor protector 62 comprising a pair of in-line thermally activated internal protectors 64 and 66 disposed in series in the line 80A of the evaporator fan motor protection circuit 80. The internal protector 64 is operatively associated with the low speed winding of the evaporator fan motor and is activated to open in the event that the temperature of the low speed winding exceeds a design break point temperature. Similarly, the internal protector 66 is operatively associated with the high speed winding of the evaporator fan motor and is activated to open in the event that the temperature of the high speed winding exceeds a design break point temperature.

Figure 7:
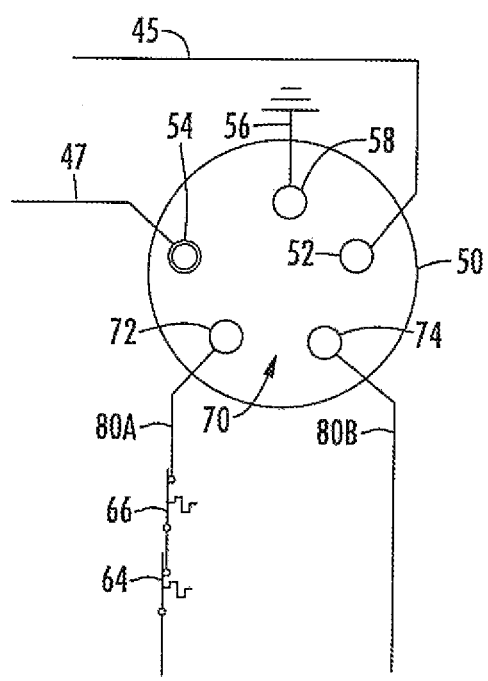
FIG. 7 is a schematic diagram illustrating an auxiliary power circuit outlet incorporating a safety power interlock.

The safety interlock 70 is provided in the evaporator fan motor internal protector 62 in series with the internal protectors 64 and 66 of the evaporator fan motor internal protector circuit 80. As illustrated in FIGS. 6 and 7, the safety interlock 70 is formed between the contact 72 of the outlet 50 connected to line section 80A of the evaporator fan motor protector circuit 80 and the contact 74 of the outlet 50 connected to line section 80B of the evaporator fan motor protector circuit 80 within the transport refrigeration unit 20.

When an auxiliary system, such as the ozone purification unit 36, is installed in association with the transport refrigeration unit 20, a connector 82 at the end of power pigtail (not shown) of the auxiliary system is mated with the outlet 50. The connector 82 includes a jump wire 84 that, when the connector 82 is mated with the outlet 50, completes the circuit between the contacts 72 and 74, whereby the evaporator fan motor internal protector circuit 80 is completed. With the evaporator fan motor internal protector circuit closed, the system controller (not shown) will permit the supply of power from the high voltage power circuit to the transport refrigeration unit 20 and electrical power will be delivered to the compressor, the condenser fan motor(s) the evaporator fan motor(s) and other electrical components.

However, when the auxiliary system, e.g. the ozone purification system 36, is removed at the completion of the trip, the auxiliary unit power connector 82 is unplugged from the outlet 50, which results in the evaporator fan motor internal protector circuit 80 being open between the contacts 72 and 74. With the gap between the contacts 72 and 74 being open, the system controller (not shown) associated with the transport refrigeration unit 20 will cut off the supply of power to the transport refrigeration unit from the high power voltage circuit in the same manner as the controller would in the event that one of the internal protectors 64 or 66 were to open. Therefore, no power is present at the contacts 52 and 54 of the auxiliary power circuit outlet 50.

Figure 8:
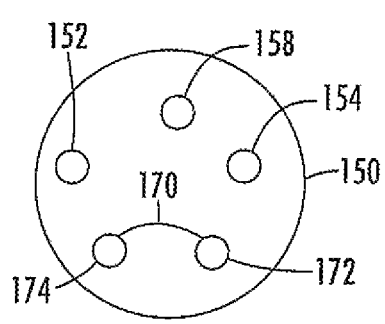
FIG. 8 is a schematic diagram illustrating a seal cap adapted to mate with the auxiliary power circuit outlet when no auxiliary system is installed on the transport refrigeration unit.

A seal cap 150 is provided that is adapted to mate with the auxiliary power circuit outlet 50 whenever no auxiliary system is installed in connection with the transport refrigeration unit 20. Referring now to FIG. 8, the seal cap 150 includes a contact 172 and a contact 174 and a jumper wire 170 connecting the contact 72 and the contact 74 in electrical communication. When no auxiliary system is installed on the refrigeration unit 20, the seal cap 150 is plugged into the auxiliary power circuit outlet 50, whereby the contacts 172 and 174 mate with the contacts 72 and 74, respectively, thereby completing the circuit between the contacts 72 and 74 via the jumper wire 170. In this manner, power is again supplied to the various components of the refrigeration unit 20 through the main power supply circuit 80. Additionally, when the seal cap 150 is plugged into the auxiliary power circuit outlet 50, the contacts 52, 54 and 58 are covered and sealed by the contacts 152, 154 and 158, respectively, thereby preventing accidental electrical shock to service personnel and protecting the outlet 50 from moisture and corrosive attack.

Thus, a pre-wired auxiliary power circuit is built into the transport refrigeration system 20 for supplying electrical power to an optional auxiliary system when installed in connection with the transport refrigeration unit 20 using existing spare wiring in the units wiring harness and tapping off an existing power supply circuit in the unit. Additionally, a low cost safety interlock is provided in association with the auxiliary power circuit. In accord with the transport refrigeration unit 20 and the method disclosed herein, the safety interlock 70 is integrated into the evaporator motor internal protector 62 for controlling the supply of power to the optional auxiliary systems that may be installed in connection with the transport refrigeration unit 20. The existing wiring for the evaporator fan motor internal protector is routed in series through a jumper wire in the connector at the end of power pigtail (not shown) of the auxiliary system that is mated with the auxiliary power circuit outlet 50 when the auxiliary system is installed.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A transport refrigeration unit for conditioning an atmosphere within a transport cargo space, comprising:
    an auxiliary electrical power circuit tapping off an electrical power circuit operatively associated with the transport refrigeration unit as a source of electrical power to which an auxiliary system is connected when installed in operative association with the transport refrigeration unit; and
    a safety power interlock in operative association with a main power supply circuit of the transport refrigeration unit, the safety power interlock breaking the main power supply circuit when the auxiliary system is removed.

2. The transport refrigeration unit as recited in claim 1 further comprising a seal cap disposed in operative association with the auxiliary electrical power circuit and with the safety power interlock when the auxiliary system is removed, the seal cap closing the safety power interlock so as to supply electrical power through the main power supply circuit to the transport refrigeration unit.

3. The transport refrigeration unit as recited in claim 1 further comprising an evaporator module operatively associated with the cargo space and at least one evaporator fan motor, the auxiliary electrical power circuit tapping off the electrical power circuit for supplying power to the at least one evaporator fan motor, the auxiliary electrical power circuit being energized only when the evaporator fan motor is energized.

4. The transport refrigeration unit as recited in claim 3 wherein the auxiliary electrical power circuit comprises:
    a first auxiliary contactor in operative association with a high speed contactor for supplying electrical power to the at least one evaporator fan motor; and
    a second auxiliary contactor in operative association with a low speed contactor for supplying electrical power to the at least one evaporator fan motor.

5. The transport refrigeration unit as recited in claim 4 further comprising:
    a first in-line fuse operatively connected between the first auxiliary contactor and the source of electrical power; and
    a second in-line fuse operatively connected between the second auxiliary contactor and the source of electrical supply.

6. The transport refrigeration unit as recited in claim 1 further comprising an auxiliary electrical power outlet comprising:
    a first contact in electrical communication with the source of electrical power;
    a second contact in electrical communication with the source of electrical power;
    a third contact in electrical communication with an electrical ground;
    a fourth contact forming a first terminal in the main power supply circuit; and
    a fifth contact forming a second terminal in the main power supply circuit; the main power supply circuit being open between the first and second terminals.

7. The transport refrigeration unit as recited in claim 6 further comprising a seal cap adapted to mate with the auxiliary electrical power outlet, the seal cap when mated with the auxiliary electrical power outlet establishing an electrical connection between the fourth and fifth contacts and blocking electrical connection with the first, second and third contacts.

8. A method for powering an auxiliary system associated with a transport refrigeration unit, the method comprising:
    providing an auxiliary electrical power circuit tapping off an electrical power circuit operatively associated with the transport refrigeration unit as a source of electrical power to which the auxiliary system connects when installed; and
    providing a safety power interlock in operative association with a main power supply circuit of the transport refrigeration unit the safety power interlock opening the main power supply circuit when the auxiliary system is removed.

9. The method as set forth in claim 8 further comprising providing a seal cap in operative association with the auxiliary electrical power circuit and with the interlock when the auxiliary system is removed, the seal cap closing the interlock to supply electrical power through the main power supply circuit to the transport refrigeration unit.

* * * * *